Patented June 14, 1949

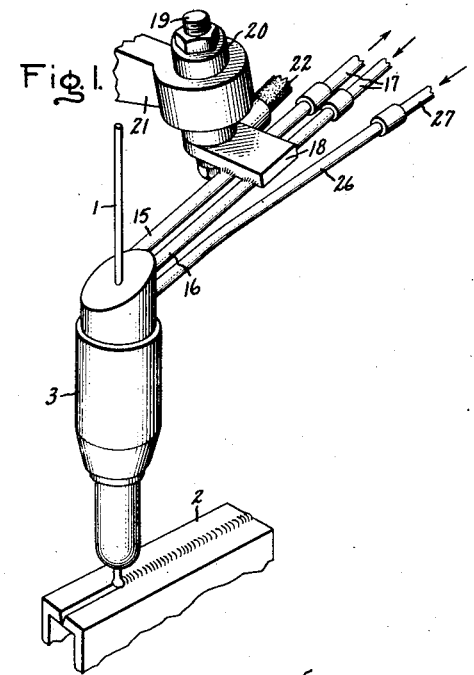
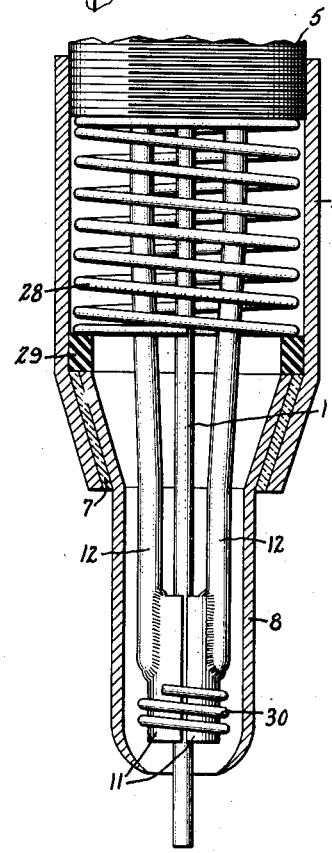
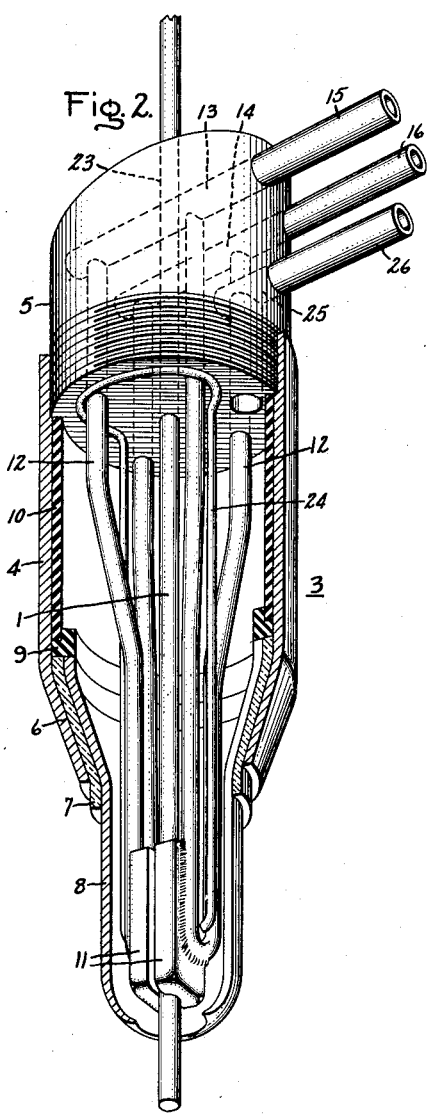

2,473,258

UNITED STATES PATENT OFFICE 2,473,258

GAS-ARC TORCH

Everett F. Potter, Schenectady, N. Y., assignor to General Electric Company, a corporation of New York Application December 20, 1946, Serial No. 717,539

9 Claims. (Cl. 219—15)

My invention relates to arc welding apparatus and more particularly to an electrode holding gas nozzle or torch for gas-arc welding operations.

In gas-arc welding operations, a gaseous atmosphere of desired character is supplied to and about the welding arc and the portions of the work rendered molten thereby. The arc may be established between a plurality of electrodes or between an electrode and the work.

In torches of the kind referred to, it is desirable to supply welding current to the electrode therein at a point closely adjacent its arcing terminal in order to increase the current carrying capacity of the electrode and thereby reduce the size and weight of the torch. The current carrying capacity of the electrode may be further increased by suitable fluid cooling means associated therewith. It is also desirable in such torches to insulate the top portion of the nozzle so that the arc cannot be established between the tip and the work or strike over from the electrode to the tip and then to the work. Furthermore, the tip, being closely adjacent the point of welding and subject to the great heat of the arc as well as to the effect of weld spatter, must be frequently replaced with a new or reconditioned tip in order to keep the torch in the best operating condition. It is, consequently, desirable to construct the torch so that its tip portion may be readily detached and replaced whenever it has become damaged or so badly worn that a new tip is required if the torch as a whole is to continue to function satisfactorily.

It is an object of my invention to provide a gas-arc torch of new and improved construction.

It is a further object of my invention to provide a gas-arc torch having a tip which may be readily detached from the nozzle body and replaced with a new or reconditioned tip whenever conditions require such renewal thereof.

It is also an object of my invention to provide a gas-arc torch having fluid cooled electrode holding jaws located closely adjacent the arcing terminal of the electrode supported thereby and enclosed within the renewable tip portion of a nozzle structure which encloses the electrode holder and supplies gas to the arcing terminal of the electrode supported therein.

Further objects of my invention will become apparent from a consideration of the embodiments thereof illustrated in the accompanying drawing.

In the drawing Fig. 1 is a perspective view showing a gas-arc torch embodying my invention; Fig. 2 is a perspective view, partly in section, illustrating the structural details of the torch illustrated in Fig. 1; and Fig. 3 is a sectional view of a modification of my invention.

The gas-arc torches illustrated in the drawing comprise a nozzle assembly embodying a renewable and readily detached tip which is electrically insulated from the body portion of the nozzle. This nozzle assembly completely encloses an electrode holder having water cooled jaw members located within its tip near the arcing terminal of the electrode supported in the electrode holder and having its arcing terminal projecting through the gas discharging opening in the nozzle tip. The jaw members of the holder are supported on coextensive tubular members extending lengthwise of the nozzle and through which cooling fluid is supplied for cooling the jaw members. These tubular members are mounted on a support which also acts as a support for the nozzle assembly. Means within the nozzle are provided for holding the body portion and tip portion of the nozzle in assembled relationship. Means are also provided for supplying electricity to the jaw members, cooling fluid to the tubular suport members for these jaw members, and gas to the interior of the nozzle assembly.

The torch illustrated in Figs. 1 and 2 is of the type used for establishing a welding arc between an electrode 1 and the work 2 while supplying about the arcing terminal of the electrode and the portions of the work rendered molten thereby, a supply of gas through the agency of a nozzle 3.

As shown in Fig. 2, nozzle 3 comprises a cylindrical body portion 4 having at one end a threaded gas-tight connection with the end of a cylindrical support 5 and having at its other end, inturned portions forming a gas-tight seating surface 6 for the outer tapered wall of an electrically nonconducting conical bushing 7. This conical bushing is also provided with a conically tapered inner wall forming a gas-tight connection with the correspondingly tapered inner end of a nozzle tip 8. The conical bushing 7 and nozzle tip 8 are held in assembled relationship with their tapered seating surfaces nesting one within the other and with the nozzle tip 8 extending through the nozzle body 4 by means of a washer 9 and a cylindrical sleeve 10 which engage the inside wall of the nozzle body 4. Washer 9 and sleeve 10 are of electrically nonconducting material and are held in the assembled relationship shown, with washer 9 engaging the inner ends of a conical bushing 7 and nozzle tip 8, by means of the pressure exerted on sleeve 10 by reason of its engagement with the inner end of the nozzle support 5.

The nozzle support 5 and the body portion 4 and tip portion 8 of the nozzle 3 are made of metal and the nozzle tip is electrically insulated from the nozzle body and its support by means of the conical bushing 7, washer 9 and sleeve 10, all of which, as has been previously noted, are formed of electrically insulating material. Since the bushing 7 is subjected to considerable heat, it is preferably formed of some ceramic material. The washer 9 and sleeve 10, on the other hand, being more removed from the heat of the arc, may be formed of some other insulating material, such as fiber or the like.

The nozzle assembly just described encloses an electrode holder having jaw members 11 located within the nozzle tip 8 and supported at the loop ends of a pair of metallic tubes 12 formed into coextensively and closely spaced flattened loops extending lengthwise of the nozzle body and of the nozzle tip. These tubular members 12 project from the nozzle support 5 and have their ends mounted on the inner end thereof with the passageways through said tubes connected respectively with the supply and exhaust headers 13 and 14 extending transversely of the support 5. Cooling fluid is furnished to the supply and exhaust headers 13 and 14 through pipes 15 and 16 which are connected at their ends with hoses 17 which in turn are connected to a source of fluid supply and to a discharge space for the fluid supply.

The torch is supported by means of a lug 18 which is welded or otherwise attached to the pipes 15 and 16 and provided with an opening for a bolt 19 which secures the lug 18 to an insulating member 20 mounted in the end of a support arm 21. Welding current is supplied to the electrode 1 through a cable 22 having its terminal lug secured in engagement with the torch lug 18 by means of the bolt 19. Lug 18, pipes 15 and 16, nozzle support 5, tubular members 12, and jaws 11 are all formed of metal so that the connection made at the torch support with the supply of welding current completes an electrically conducting connection between this supply and the electrode 1 held within the electrode holder of the torch by the jaw members 11 thereof.

The torch support 5 is provided with an electrode passageway 23 which forms a gas-tight connection about the electrode 1 and extends lengthwise through the support 5 in registry with the electrode engaging surfaces of the jaw members 11. These jaw members are held in engagement with the electrode 1 by reason of the natural resiliency of the tubular members 12. The clamping action of these members on the electrode may, however, be reinforced by a spring means 24 extending lengthwise of the tubular members having its inner end looped around one branch of each of these tubular members and having its outer ends engaging the jaw members 11 at points near their center and located between the looped ends of these tubular members which are attached to the jaw members 11 by means of welding or some other suitable means.

Gas is supplied to the interior of the nozzle assembly through a passageway 25 in the nozzle support 5 which is connected through a tube 26 to a hose 27 which in turn is connected to a suitable supply of gas. For inert arc welding, this supply of gas may be some suitable inert gas, such as helium or argon, but it is, of course, apparent that other suitable supplies of gases may be used depending on the welding operation to be performed with the gas-arc torch illustrated.

The arrangement illustrated in Fig. 2 may be modified in the manner illustrated in Fig. 3. In this figure, the nozzle body 4 and nozzle tip 8 are held in assembled relationship by means of a coil spring 28 one end of which engages the inner end of the nozzle support 5 and the other end of which engages and forces a washer 29 into engagement with the inner ends of the conical bushing 7 and nozzle tip 8. The washer 29 is made of some insulating material, such as fiber, in order completely to insulate the nozzle tip from the nozzle body, which are insulated from one another along their seating surfaces by forming, as in Fig. 2, the bushing 7 of some insulating material, such as a ceramic. It will also be noted in Fig. 3 that the electrode holding jaws 11 are held in engagement with the electrode 1 through the agency of a spring means 30 which reinforces the resiliency of the tubular members 12 as does the spring 24 in Fig. 2. The spring means 30 comprises a helical constriction spring which is fitted over the cylindrical outer walls of the jaw members 11 and which by its constricting force thereon forces these jaw members to make a good electrical connection with the electrode therebetween. It is understood, of course, that in Fig. 3, as in Fig. 2 the nozzle body 4 and nozzle tip 8 are formed of metal and, by reason of the insulating washer 29, the spring 28 may also be formed of metal. As in Fig. 3, welding current is supplied to the jaw members 11 through tubular members 12, which are formed of metal and are attached at their looped ends to the jaws 11 by welding or brazing or some other suitable connecting means.

In both of the illustrated embodiments of my invention, whenever it becomes necessary to replace a damaged tip portion 8 of the nozzle, the body portion 4 thereof may be disassembled from its support 5 and the nozzle tip 8 then disengaged from its connection with the nozzle body 4 by moving it lengthwise through the support end of the nozzle body 4. A new nozzle tip may then be inserted in the nozzle body and the assembly completed with the parts in the positions illustrated in the drawing. The electrode may be fed through the jaw members 11 as it is consumed by the welding arc by taping its end which projects through the nozzle support 5.

By fluid cooling the jaw members 11 which are located closely adjacent the arcing terminal of the electrode and within the nozzle tip 8, the torch will operate at a lower temperature for a given welding current flow than it would without the cooling effect of the tubular members 12, and the size and weight of the torch may correspondingly be reduced. This is an item of great importance in machine welding as illustrated and of greater importance where the torch is to be used for manual arc welding since if the torch is heavy and cumbersome the operator will be fatigued and consequently less able to perform a satisfactory welding operation. For manual arc welding, the tubes 15, 16 and 26 will be enclosed within a handle which may be gripped and held by the hand of the welding operator, and welding current may be supplied to the tubes 15 and 16 through conductors enclosed within hoses 17 in accordance with an arrangement such as shown in U. S. Letters Patent 2,307,553, Irving F. Weller, January 5, 1943. In fact, by using a pair of angularly disposed nozzles, such as illustrated in the drawing, and by supplying hydrogen thereto, it is possible to provide an atomic hydrogen torch, another form of which is illustrated in the above referred to Weller patent.

Other modifications and uses of my improved gas-arc torch will occur to those skilled in the art in view of the particular arrangements illustrated and described. I aim, therefore, in the appended claims to cover all such modifications as fall within the true spirit and scope of my invention.

What I claim as new and desire to secure by Letters Patent of the United States is:

1. A gas-arc torch comprising a support, a nozzle body having one end mounted on and forming a gas-tight connection with said support and having therein a seating surface tapering toward its other end, a nozzle tip extending through and beyond said nozzle body and having a discharge opening in its projecting outer end and at its inner end a seating surface nesting within and tapered to form a gas-tight connection with the tapered seating surface of said nozzle body, means within said nozzle body and engaging said support and the inner end portion of said nozzle tip for holding said nozzle tip and said nozzle body in assembled relationship with said tapered seating surfaces nesting one within the other and said nozzle tip extending through and beyond said nozzle body, an electrode holder within said nozzle body and said nozzle tip and having jaw members which positions an electrode lengthwise of said nozzle tip with its arcing terminal extending through said discharge opening at its outer end, means for mounting said electrode holder on said support and for supplying electricity to said jaw members, and means for supplying gas to said nozzle body.

2. A gas-arc torch comprising a support, a nozzle body having one end mounted on and forming a gas-tight connection with said support and having therein a seating surface tapering toward its other end, a nozzle tip extending through and beyond said nozzle body and having a discharge opening in its projecting outer end and at its inner end a seating surface nesting within and tapered to form a gas-tight connection with the tapered seating surface of said nozzle body, means within said nozzle body and engaging said support and the inner end portion of said nozzle tip for holding said nozzle tip and said nozzle body in assembled relationship with said tapered seating surfaces nesting one within the other and said nozzle tip extending through and beyond said nozzle body, an electrode holder extending through said nozzle body and said nozzle tip and having in said nozzle tip adjacent its discharge opening jaw members which positions an electrode lengthwise of said nozzle tip with its arcing terminal projecting through the discharge opening in said nozzle tip, means for mounting said electrode holder on said support and for supplying electricity to said jaw members, and means for supplying gas to said nozzle body.

3. A gas-arc torch comprising a support, a nozzle body having one end mounted on and forming a gas-tight connection with said support and having therein a seating surface tapering toward its other end, a conical bushing engaging said seating surface in said nozzle body and having correspondingly tapered inner and outer wall portions with its outer wall taper corresponding with and forming a gas-tight fit with said tapered seating surface of said nozzle body, a nozzle tip extending through and beyond said nozzle body and having a discharge opening in its projecting outer end and at its inner end a seating surface which engages and is tapered to form a gas-tight fit with the inner tapered surface of said conical bushing, means within said nozzle body and engaging said support and the inner ends of said conical bushing and said nozzle tip for pressing said bushing and said nozzle tip into nesting engagement with one another and the tapered seating surface of said nozzle body, an electrode holder within said nozzle body and said nozzle tip and having jaw members which positions an electrode lengthwise of said nozzle tip with its arcing terminal extending through said discharge opening at its outer end, means for mounting said electrode holder on said support and for supplying electricity to said jaw members, and means for supplying gas to said nozzle body.

4. A gas-arc torch comprising a support, a nozzle body having one end mounted on and forming a gas-tight connection with said support and having therein a seating surface tapering toward its other end, a conical bushing engaging said seating surface in said nozzle body and having correspondingly tapered inner and outer wall portions with its outer wall taper corresponding with and forming a gas-tight fit with said tapered seating surface of said nozzle body, a nozzle tip extending through and beyond said nozzle body and having a discharge opening in its projecting outer end and at its inner end a seating surface which engages and is tapered to form a gas-tight fit with the the inner tapered surface of said conical bushing, means within said nozzle body and of sufficient width to engage the inner ends of said conical bushing and said nozzle tip and press them into nesting engagement with one another and the tapered seating surface of said nozzle body, a spring coil located within said nozzle body and acting on said support and said last mentioned means, an electrode holder within said nozzle body and said nozzle tip and having jaw members which position an electrode lengthwise of said nozzle tip with its arcing terminal extending through said discharge opening at its outer end, means for mounting said electrode holder on said support and for supplying electricity to said jaw members, and means for supplying gas to said nozzle body.

5. A gas-arc torch comprising an electrically conducting support, an electrically conducting nozzle body having one end in electrically conducting engagement with and mounted on and forming a gas-tight connection with said support and having its other end turned inwardly to form a tapered seat, an electrically nonconducting conical bushing engaging said seating surface in said nozzle body and having correspondingly tapered inner and outer wall portions, the outer wall taper corresponding with and forming a gas-tight fit with the inwardly tapered seat of said nozzle body, an electrically conducting nozzle tip extending through and beyond said nozzle body and having a discharge opening in its projecting outer end and a flared inner end nested within and tapered to form a gas-tight fit with the inner tapered seat of said conical bushing, electrically nonconducting means within said nozzle body and engaging said support and the flared end portion of said nozzle tip to hold said nozzle tip and said nozzle body in assembled relationship with said nozzle tip extending through and beyond said nozzle body and its flared inner end nested within said tapered seat of said nozzle body, an electrode holder extending through said nozzle body and said nozzle tip and having in said nozzle tip adjacent its discharge opening jaw members which position an electrode lengthwise of said nozzle tip with its arcing terminal projecting through the discharge opening in said nozzle tip, means for mounting said electrode holder on and in electrically conductive engagement with said support, means for supplying electricity to said support, and means for supplying gas to said nozzle body.

6. A gas-arc torch comprising a support, a pair of coextensive and resilient tubular members mounted on said support and projecting in the same directions therefrom, a pair of opposed electrode holding jaws respectively mounted on the projecting ends of said tubular members and held in engagement with an electrode inserted therebetween by the resiliency of said tubular members, a nozzle having an open tip and a gas-tight connection with said support, said nozzle enclosing said tubular members and said jaws so that an electrode located between said jaws extends through the open tip of said nozzle, means for supplying electricity to said jaws, means for supplying cooling fluid through said tubular members, and means for supplying gas to said nozzle.

7. A gas-arc torch comprising a support, a pair of coextensive tubular members mounted on said support and projecting in the same directions therefrom, a pair of opposed electrode holding jaws respectively mounted on the projecting ends of said tubular members for engaging opposite sides of an electrode extending lengthwise thereof, spring means engaging said jaws and biasing them toward one another and into engagement with an electrode therebetween, a nozzle having an open tip and a gas-tight connection with said support, said nozzle enclosing said tubular members, said jaws and said spring means so that an electrode located between said jaws extends through the open tip end of said nozzle, means for supplying electricity to said jaws, means for supplying cooling fluid through said tubular members, and means for supplying gas to said nozzle.

8. A gas-arc torch comprising a support having therein supply and exhaust headers for cooling fluid and having therethrough a longitudinal passageway for an electrode, a pair of coextensive tubular members mounted on said support, projecting therefrom, and having the passageways therethrough connected between said supply and exhaust headers in said support, a pair of electrode holding jaws respectively mounted on the projecting ends of said tubular supports for engaging opposite sides of an electrode extending lengthwise thereof and in registry with said electrode passageway through said support, spring means engaging said jaw members and biasing them toward one another and into engagement with an electrode therebetween, a nozzle forming a gas-tight connection with said support and having a discharge opening in its tip, said nozzle enclosing said tubular members, said jaws and said spring means so that an electrode located between said jaws extends through the discharge opening in the tip of said nozzle, means for supplying electricity to said jaws, means for supplying cooling fluid through said headers in said support and through said tubular members, and means for supplying gas to said nozzle.

9. A gas-arc torch comprising a metallic support having therein supply and exhaust headers for cooling fluid and having therethrough a longitudinal passageway for an electrode and another passageway for gas, a metallic nozzle body having one end mounted on and forming a gas-tight connection with said support and having therein a seating surface tapering toward its other end, an electrically nonconducting conical bushing engaging said seating surface in said nozzle body and having corresponding tapered inner and outer wall portions with its outer wall taper corresponding with and forming a gas-tight fit with said tapered seating surface of said nozzle body, a metallic nozzle tip extending through and beyond said nozzle body and having a discharge opening in its projecting outer end and at its inner end a seating surface which engages and is tapered to form a gas-tight connection with the inner tapered surface of said conical bushing, electrically nonconducting means within said nozzle body and engaging said support and the inner ends of said conical bushing and said nozzle tip for holding said conical bushing, said nozzle tip and said nozzle body in assembled relationship with said tapered seating surfaces nesting one within the other and said nozzle tip extending through and beyond said nozzle body, a pair of metallic tubes formed into coextensive and closely spaced flattened loops which extend lengthwise of said nozzle body and said nozzle tip and each of which has its ends mounted on and in electrically conducting engagement with said support with the passageway therethrough connected respectively with said supply and exhaust headers in said support, a pair of metallic electrode holding jaws mounted within said nozzle tip on and in electrically conducting engagement with the loop ends of said tubes, said jaws being located on opposite sides of an electrode extending lengthwise of said nozzle body and said nozzle tip in registry with the electrode passageway through said support, spring means engaging said jaw members and biasing them toward one another and into engagement with an electrode therebetween, means connected with said support for supplying electric current thereto and through said tubes and said jaws to an electrode engaged by said jaws, means for supplying cooling fluid through said headers in said support and through said tubes, and means for supplying gas to said nozzle body and nozzle tip through said gas passageway in said support.

EVERETT F. POTTER.

REFERENCES CITED

The following references are of record in the file of this patent:

UNITED STATES PATENTS

| Number | Name | Date |
|---|---|---|
| 2,184,335 | Chapman | Dec. 26, 1939 |
| 2,216,564 | Chapman | Oct. 1, 1940 |
| 2,306,050 | Frischmann | Dec. 22, 1942 |
| 2,376,265 | Meredith | May 15, 1945 |